J. A. LATSHAW.
NUT LOCK.
APPLICATION FILED APR. 13, 1911.

1,017,770. Patented Feb. 20, 1912.

Inventor
J. A. Latshaw

Witnesses
W. N. Woodson
Cora N. Handy

By
M. A. Macey, Attorneys

UNITED STATES PATENT OFFICE.

JOHN A. LATSHAW, OF VANPORT, PENNSYLVANIA.

NUT-LOCK.

1,017,770.     Specification of Letters Patent.     Patented Feb. 20, 1912.

Application filed April 13, 1911. Serial No. 620,922.

*To all whom it may concern:*

Be it known that I, JOHN A. LATSHAW, citizen of the United States, residing at Vanport, in the county of Beaver and State of Pennsylvania, have invented certain new and useful Improvements in Nut-Locks, of which the following is a specification.

It is the object of the present invention to provide an improved means for locking a nut to its bolt, the means being embodied in a novel form of locking key which may be readily applied to the nut and bolt and readily removed therefrom when it is desired to remove the nut from the bolt.

One feature of the invention resides in the provision of a locking key for a nut and bolt, including a stem fitting in registering grooves in the bolt and nut, and a head which rests yieldably in engagement with the threads of the bolt, the key being in this manner effectually held against the disengagement of its stem from the said grooves.

For a full understanding of the invention reference is to be had to the following description and accompanying drawing, in which:—

Figure 1:
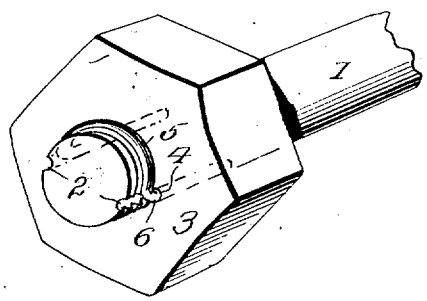
Figure 3:
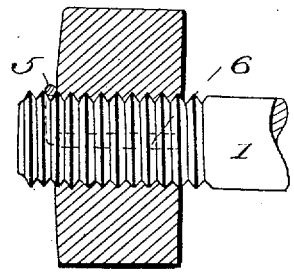
Figure 2:
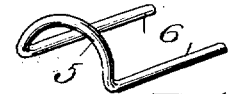
Figure 2:
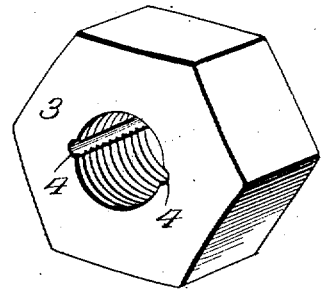
Figure 4:
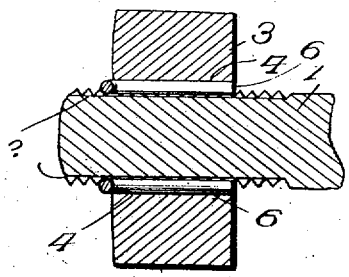

Figure 1 is a perspective view showing the locking key embodying the present invention applied to a nut and bolt. Fig. 2 is a perspective view of the key and nut. Fig. 3 is a longitudinal sectional view through the nut, bolt and key. Fig. 4 is a horizontal sectional view.

Corresponding and like parts are referred to in the following description and indicated in all the views of the accompanying drawing by the same reference characters.

In the drawing, the numeral 1 indicates an ordinary bolt which is formed with longitudinally extending grooves 2, preferably diametrically oppositely located. The nut which is threaded upon the bolt is indicated by the numeral 3 and has the wall of its bolt opening formed with grooves 4 which are designed to register with the grooves 2 when the nut has been threaded upon the bolt to the desired position.

The locking key embodying the invention is illustrated as formed from a single length of wire having its intermediate portion bent to substantially semi-annular form as at 5, and its portions to each side of the head thus formed, bent to form parallel stems 6. These stems extend from the ends of the head 5 and at right angles to the plane occupied by the head. In applying the key to the nut and bolt its stems 6 are inserted into the registering grooves in the said nut and bolt and its semi-annular head 5 is snapped into engagement between the threads immediately in advance of the outer face of the nut 3. As the key is preferably formed from resilient wire, its head 5 may be readily sprung out of engagement with the threads of the bolt when it is desired to remove the key and subsequently remove the nut from the bolt.

Having thus described the invention what is claimed as new is:—

1. In a nut lock, the combination with a bolt formed with grooves and a nut formed in the wall of its bolt opening, with a groove said grooves registering with the grooves in the bolt, of a locking key comprising spaced stems fitting in the registering grooves, and a head from which the stems project, the said head resting yieldably in engagement with the threads of the bolt.

2. In a nut lock, the combination with a bolt formed with grooves and a nut formed in the wall of its bolt opening with a groove, registering with the grooves in the bolt, of a locking key formed from a single length of wire bent to form spaced stems fitting in the registering grooves, and a connecting substantially semi-annular head yieldably engaging with the threads of the bolt and partially encircling said bolt.

In testimony whereof, I affix my signature in presence of two witnesses.

JOHN A. LATSHAW. [L. S.]

Witnesses:
    M. FLOCKER,
    JULIA R. FLOCKER.